(No Model.)
A. J. CRAIG.
CULTIVATOR.
No. 313,811. Patented Mar. 10, 1885.
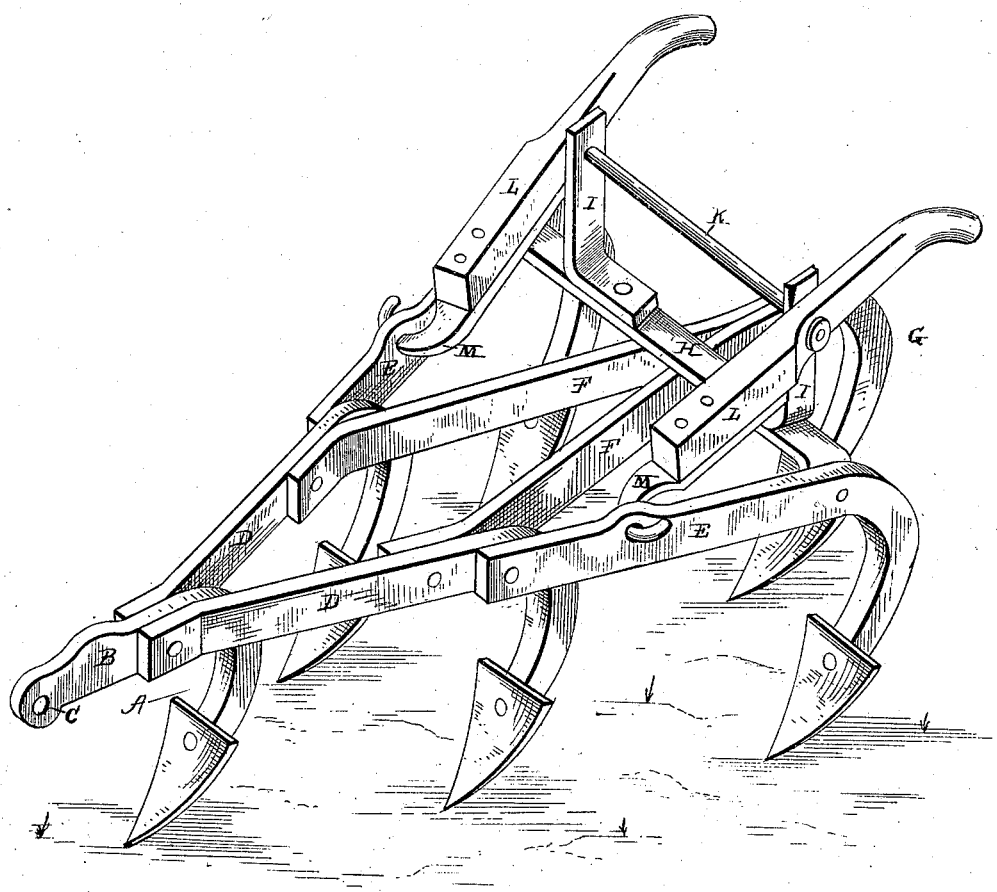
WITNESSES
Edwin L. Jewell
J. J. McCarthy
INVENTOR
A. J. Craig
By E. N. Alexander
Attorney

UNITED STATES PATENT OFFICE.

ANDREW J. CRAIG, OF HICKORY, MISSISSIPPI.

CULTIVATOR.

SPECIFICATION forming part of Letters Patent No. 313,811, dated March 10, 1885.

Application filed August 6, 1884. (No model.)

*To all whom it may concern:*

Be it known that I, ANDREW J. CRAIG, a citizen of the United States, residing at Hickory, in the county of Newton and State of Mississippi, have invented certain new and useful Improvements in Cultivators, of which the following is a specification, reference being had therein to the accompanying drawing.

My invention relates to certain improvements in cultivators, and is designed to produce a device that shall be equally applicable to even and uneven ground, also one that shall work easily for both horses and operator.

In describing the device, reference will be had to the annexed drawing, representing a perspective view of the device.

A designates an opener having an extended end, B, provided with an eye, C. The opener is pivoted between two bars, D, which, receding one from the other, extend backward for a distance, and, being bent downward, form a hooked end, to which is secured the plow or shovel.

Hinged or pivoted to the bars D on the outside, above the hooked portion, are bars E, which extend to the rear and recede one from the other at the same angle about as do the bars D, and terminate likewise in a hook, to which is secured a plow or shovel.

Pivoted to each of the bars D, on the inside, is a V-shaped bar, F, terminating in a single hook, G, which carries a plow or shovel, on a line with opener, and somewhat to the rear of those on the bars E. A piece H, is pivoted to the rear of each of the bars E and connects them, adding strength to the device and serving as a support for the standards I, through the upper ends of which passes the rod K, pivoting the handles L to the standards. These handles extend toward the front, slanting downward to give them the right pitch, and terminate in hooks M, which pass through holes in the bars E, and so hold the parts in proper relation one to the other. The piece H acts also as a stop for the bar F, preventing a too great upward movement of the same.

It will be noticed that the parts being pivoted one to the other makes the device very flexible, so that it will readily accommodate itself to uneven ground, cutting to an even depth, and thus being much easier on both the horses and the operator than one of ordinary construction.

Having described the device, what I claim is—

1. In a cultivator, the combination of a pivoted opener, a series of diverging plows having their beams pivoted to the opener and to each other, respectively, and a central plow projecting to the rear, said central plow having a divided beam, the divisions being pivoted to the side beams near the front of the cultivator, substantially as and for the purpose specified.

2. The combination, in a cultivator, of a pivoted opener, with an extended end formed into an eye, a diverging series of plows pivoted to the opener and to each other, respectively, a central plow with a divided beam pivoted to the forward end of the cultivator, and pivoted handles supported on a frame, substantially as and for the purpose specified.

In testimony whereof I affix my signature in presence of two witnesses.

ANDREW J. CRAIG.

Witnesses:
ROBT. W. BURTON,
J. C. MCBEATT.